United States Patent
Bolotin et al.

(10) Patent No.: US 10,992,747 B2
(45) Date of Patent: Apr. 27, 2021

(54) DATA STORAGE SYSTEM WITH REMOVABLE DEVICE AND METHOD OF OPERATION THEREOF

(71) Applicant: ClevX, LLC, Kirkland, WA (US)

(72) Inventors: Lev M. Bolotin, Kirkland, WA (US); Alex Lemelev, Maple (CA)

(73) Assignee: ClevX, LLC, Kirkland, WA (US)

(*) Notice: Subject to any disclaimer, the term of this patent is extended or adjusted under 35 U.S.C. 154(b) by 1602 days.

(21) Appl. No.: 14/624,560

(22) Filed: Feb. 17, 2015

(65) Prior Publication Data

US 2015/0244798 A1 Aug. 27, 2015

Related U.S. Application Data

(60) Provisional application No. 61/945,748, filed on Feb. 27, 2014.

(51) Int. Cl.
  *H04L 29/08* (2006.01)
  *G06F 11/14* (2006.01)

(52) U.S. Cl.
  CPC ...... *H04L 67/1095* (2013.01); *G06F 11/1458* (2013.01); *H04L 67/1097* (2013.01)

(58) Field of Classification Search
  CPC .. H04L 67/1095; H04L 67/1097; H04L 47/80
  See application file for complete search history.

(56) References Cited

U.S. PATENT DOCUMENTS

| | | | |
|---|---|---|---|
| 7,069,447 B1 | 6/2006 | Corder | |
| 7,552,214 B2 | 6/2009 | Venkatasubramanian | |
| 7,734,594 B2 | 6/2010 | Wang | |
| 8,050,905 B2 | 11/2011 | Brunet et al. | |
| 9,075,571 B2 | 7/2015 | Bolotin et al. | |
| 9,262,611 B2 | 2/2016 | Johnson et al. | |
| 2007/0136541 A1* | 6/2007 | Herz | G06F 11/1464 711/162 |

(Continued)

FOREIGN PATENT DOCUMENTS

| KR | 2013-0128835 A | 11/2013 |
|---|---|---|
| WO | WO-2015131104 | 9/2015 |

OTHER PUBLICATIONS

How to Copy and Paste Files to a USB Memory Stick by Melanie Pinola, dated Jul. 1, 2011 Retrieved from: http://lifehacker.com/5817383/how-to-copy-and-paste-files-to-a-usb-memory-stick.*

(Continued)

*Primary Examiner* — Minh Chau Nguyen
*Assistant Examiner* — Ishrat Rashid
(74) *Attorney, Agent, or Firm* — Schwegman Lundberg & Woessner, P.A.

(57) ABSTRACT

A data storage system, and a method of operation thereof, includes: an interface module for creating a login credential for storing on a removable storage device; a backup module, coupled to the interface module, for transferring data for an automatic backup of the removable storage device to a remote backup system based on the login credential and a status of the removable storage device; and a close module, coupled to the backup module, for disconnecting an application from a cloud backup service for closing a connection between a computing device and the remote backup system with the data from the automatic backup.

28 Claims, 7 Drawing Sheets

(56) References Cited

U.S. PATENT DOCUMENTS

| | | | |
|---|---|---|---|
| 2008/0065911 A1* | 3/2008 | Elazar | G06F 21/10 |
| | | | 713/194 |
| 2009/0063711 A1* | 3/2009 | Finkelstein | G06F 17/30176 |
| | | | 710/3 |
| 2011/0246734 A1 | 10/2011 | Umbehocker | |
| 2011/0258333 A1* | 10/2011 | Pomerantz | H04L 63/08 |
| | | | 709/229 |
| 2012/0023139 A1* | 1/2012 | Greeley | G06F 21/6218 |
| | | | 707/784 |
| 2012/0266078 A1* | 10/2012 | Kulkarni | G06F 11/1464 |
| | | | 715/740 |
| 2013/0166918 A1* | 6/2013 | Shahbazi | H04L 9/0863 |
| | | | 713/183 |
| 2013/0262669 A1* | 10/2013 | Roberts | G06F 21/552 |
| | | | 709/224 |
| 2013/0304866 A1 | 11/2013 | Wu et al. | |
| 2013/0318610 A1 | 11/2013 | Zaitsev | |
| 2015/0172304 A1* | 6/2015 | Kleczynski | H04L 63/1416 |
| | | | 726/23 |
| 2016/0119339 A1 | 4/2016 | Bolotin et al. | |
| 2016/0259736 A1 | 9/2016 | Bolotin et al. | |

OTHER PUBLICATIONS

"International Application Serial No. PCT/US2015/018108, Written Opinion dated May 26, 2015", 8 pgs.

International Search Report for Application No. PCT/US15/18108 dated May 26, 2015.

* cited by examiner

DATA STORAGE SYSTEM WITH REMOVABLE DEVICE AND METHOD OF OPERATION THEREOF

CROSS-REFERENCE TO RELATED APPLICATION(S)

This application claims the benefit of U.S. Provisional Patent Application Ser. No. 61/945,748 filed Feb. 27, 2014, and the subject matter thereof is incorporated herein by reference thereto.

TECHNICAL FIELD

The present invention relates generally to a data storage system, and more particularly to a system for data storage with removable devices.

BACKGROUND

Advances in computing have rendered significant changes to how people consume and interact with media. Paper documents have been replaced by digital documents. Music compact discs (CDs) and movie digital video discs (DVDs) have been replaced by streaming and downloadable content. Printed photos have been replaced by digital photos.

As most user content has become digital over the years, even schools are encouraging students to work with digital files in order to make the process more efficient and have a lower impact on the environmental resources, e.g., saving paper to print homework.

However, digital content is prone to corruption and virus attacks. Computing devices can have physical damage due to fire and flood. The computing devices can also be stolen. This necessitates that user data be backed up where it can be safe from hazardous situations.

One option is to save digital data files locally to home computers or laptops, and then, these computing devices can be backed up to external data backup devices like portable hard drives. Since the primary locations where the computers and external data backup devices are used can be prone to damaged or theft, the user data is not considered safe by virtue of being in a location that can be susceptible to fire, flooding, or theft.

Thus, a safer option is to backup user data to remote data storage facilities offered by companies that provide online data storage facilities in fireproof and flooding proof sites. This has spawned a new industry of online data backup services, where the service allows a user to save the data files from a personal computer or a laptop to a remote computing device, e.g., an online server.

Thus, instead of or in addition to making copies of data locally, a user can opt to have the data stored on a remote server using the Internet for file transfer. Typically, the user is required to sign up with a service provider and pay a monthly or yearly fee for storage of the data. Online backup service provider's software installation and high-speed Internet connectivity can facilitate rapid transfer of files.

Backing up data to the online data backup services from multiple computers has problems because it is still a complicated task especially when some of the computing devices can be untrusted by virtue of being located in publically available spaces, e.g., a computing device in a library or an Internet cafe. Since a personal computer or a laptop offers limited mobility and users have to work with multiple computing devices including untrusted ones, the users end up utilizing removable media including Universal Serial Bus (USB) drives to transport data from one computing device to another.

As noted, most people work with more than one computing device, and data backup processes are complicated. Additionally, an ordinary user is not technically savvy to use the complicated prior art data backup solutions. Thus, the market is ripe for an automated, easy to use, highly portable, and affordable backup solution.

Thus, a need still remains for a data storage system to be developed to resolve the data backup problems. In view of the ever-increasing commercial competitive pressures, along with growing consumer expectations, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

Embodiments of the present invention provide a method of operation of a data storage system, including: creating a login credential for storing on a removable storage device; transferring data for an automatic backup of the removable storage device to a remote backup system based on the login credential and a status of the removable storage device; and disconnecting an application from a cloud backup service for closing a connection between a computing device and the remote backup system with the data from the automatic backup.

The embodiments of the present invention provide a data storage system, including: an interface module for creating a login credential for storing on a removable storage device; a backup module, coupled to the interface module, for transferring data for an automatic backup of the removable storage device to a remote backup system based on the login credential and a status of the removable storage device; and a close module, coupled to the backup module, for disconnecting an application from a cloud backup service for closing a connection between a computing device and the remote backup system with the data from the automatic backup.

Certain embodiments of the present invention have other steps or elements in addition to or in place of those mentioned above. The steps or the elements will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or changes may be made without departing from the scope of the embodiments of the present invention.

In the following description, numerous specific details are given to provide a thorough understanding of the invention. However, it will be apparent that the invention may be practiced without these specific details. In order to avoid obscuring the embodiments of the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

The term "module" referred to herein can include software, hardware, or a combination thereof in the embodiments of the present invention in accordance with the context in which the term is used. For example, the software can be machine code, firmware, embedded code, and application software. Also for example, the hardware can be circuitry, processor, computer, integrated circuit, integrated circuit cores, a microelectromechanical system (MEMS), passive devices, environmental sensors including temperature sensors, or a combination thereof.

Where multiple embodiments are disclosed and described having some features in common, for clarity and ease of illustration, description, and comprehension thereof, similar and like features one to another will ordinarily be described with similar reference numerals. The embodiments have been numbered second embodiment, first embodiment, etc. as a matter of descriptive convenience and are not intended to have any other significance or provide limitations for the embodiments of the present invention.

The embodiments of the present invention overcome shortcomings of the prior art. Without limiting such solutions to consumers, a desired level of simplicity and affordability can be available to corporate users as well. Thus, in summary, systems and methods of the embodiments of the present invention provide a mechanism for an automated online user data backup from removable storage devices with minimal or no user interaction.

Computer program codes for carrying out operations of the embodiments of the present invention can be written in any combination of one or more programming languages, including an object oriented programming language, such as Java, Smalltalk, C++, and conventional procedural programming languages, such as the "C" programming language or similar programming languages. The computer program codes can also be written in dynamic programming languages.

The dynamic programming languages describe a class of high-level programming languages that execute at runtime many common behaviors that other programming languages can perform during compilation. JavaScript and a server-side scripting language including PHP Hypertext Preprocessor (PHP), Perl, Python, and Ruby are examples of the dynamic programming languages.

Additionally, the computer program codes can also be written using a web-programming stack of software, which can include open source software, usually containing an operating system, a Web server, a database server, and a programming language. A number of the embodiments can use open-source Web development platforms using Linux, Apache, MySQL, and PHP. Other examples of environments and frameworks, using which the computer program codes can also be generated, are Ruby on Rails, which is based on the Ruby programming language, or Node.js, which is an event-driven server-side JavaScript environment.

The computer program codes can execute entirely on a user's computer, partly on the user's computer, as a stand-alone software package, partly on the user's computer and partly on a remote computer, or entirely on the remote computer or a server. In the latter scenario, the remote computer can be connected to the user's computer through any type of networks, including a local area network (LAN) or a wide area network (WAN), or a connection can be made to an external computer, for example, through the Internet using an Internet Service Provider.

Computing devices that enable a user to engage with the Internet can include a memory for storing a control program and data, and a processor or a central processing unit (CPU) for executing the control program and for managing the data, which includes user data resident in the memory and buffered content. The computing devices can be coupled to a video display, such as a television, monitor, or other types of visual displays. The computing devices can include the video display incorporated in them. For example, the computing devices with the video display incorporated therein can include mobile devices, such as iPad, iPhone, or portable devices.

An application, or an app, or other simulation can be stored on a storage media, such as a USB memory key, a flash memory, a Secure Digital (SD) card, a micro-SD card, an Eye-Fi card, a Toshiba FlashAir card, or other types of memory media all collectively referred to as "removable media" in this disclosure. The app can also be downloaded from the Internet or preloaded on the portable storage media in advance. The removable media can be inserted or connected to a console of a computing device where the removable media is read. The console can then read program instructions stored on the removable media and present a user interface to the user.

Figure 1:
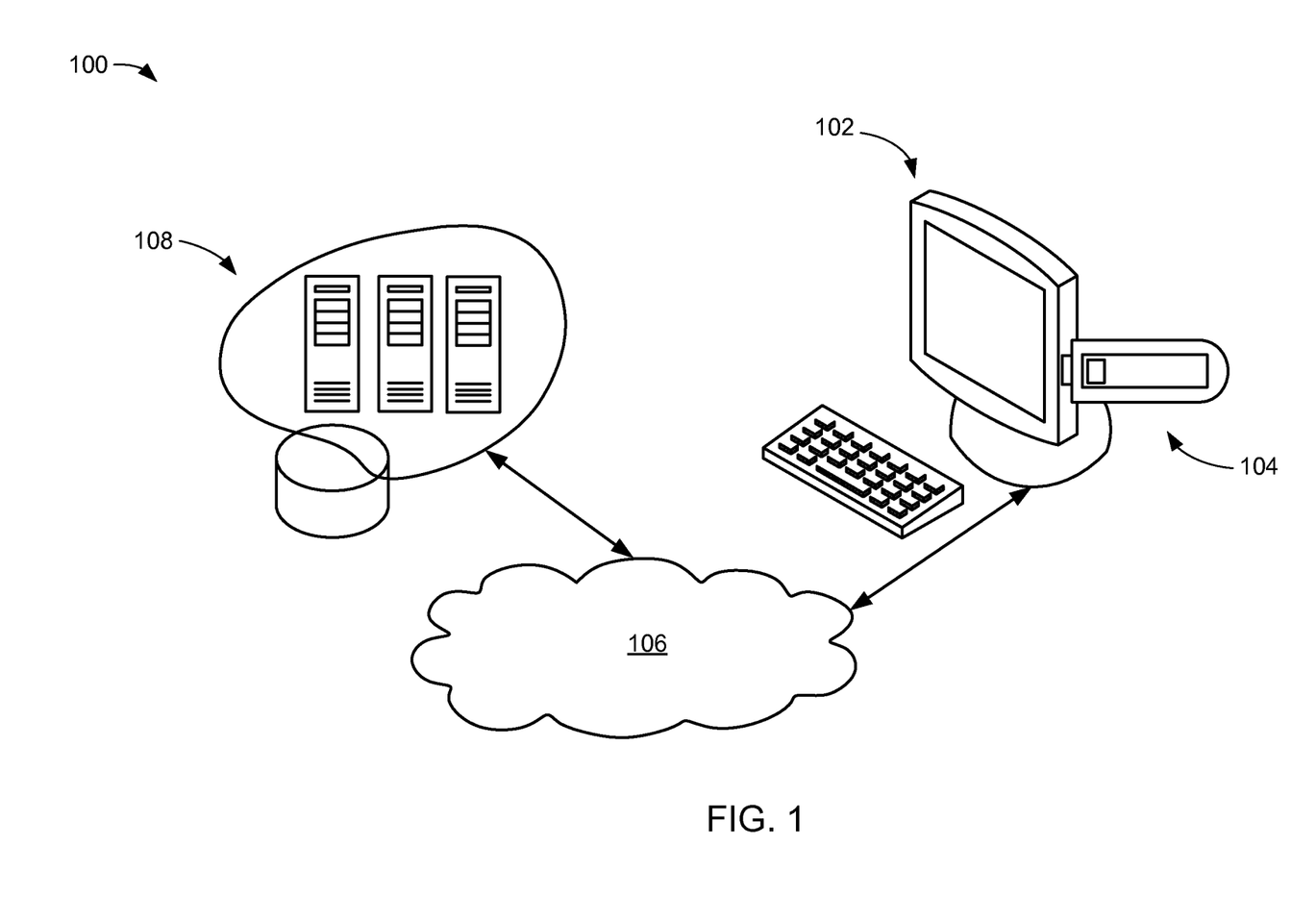
FIG. 1 is a network diagram of a data storage system in an embodiment of the present invention.

Referring now to FIG. 1, therein is shown a network diagram of a data storage system 100 in an embodiment of the present invention. The data storage system 100 can include a computing device 102, a removable storage device 104, a network 106, and a remote backup system 108.

For example, the computing device 102 can include a personal computer (PC), a desktop PC, a laptop, a Mac, a Smartphone, a tablet, a Smart television (TV), or any other computing systems. The computing device 102 can run any different number of operating systems. For example, the operating systems can include Microsoft Windows 8, Mac OS, Linux, or any other software that manages hardware resources and provides services to programs running on a computing system.

The removable storage device 104 can include a removable media. The removable storage device 104 is a type of data storage device that is capable of being removed from a computing system while the computing system is running or in operation. The removable storage device 104 can be used for data transportation and backup or storage of data since the removable storage device 104 can be cost-effective and compact in size. The removable storage device 104 can be connected and disconnected from the computing device 102 without having to power down the computing device 102 and without additional steps for safe removal.

In addition to portability advantages, the removable storage device 104 can be capable of fast data backup and recovery. For examples, the removable storage device 104 can include a removable media, such as Universal Serial Bus (USB) drives, a portable hard disk drive (HDD), SD cards, Secure Digital High Capacity (SDHC) cards, compact discs (CDs), digital video discs (DVDs), and Blu-ray discs, diskettes, and memory cards.

As a specific example, the removable storage device 104 can include a removable media, such as a memory card with a built-in wireless capability including Eye-Fi, Toshiba FlashAir, Wi-Fi, or any other wireless technologies. For example, using an Eye-Fi memory card inside a digital camera, a user can wirelessly and automatically upload digital photos to a local computing device or a mobile device, such as a Smartphone or a tablet.

Also for example, a FlashAir SD memory card can provide wireless transfer of data stored on the FlashAir SD memory card. Files stored on the FlashAir SD memory card can be read and transferred wirelessly. As an example, photos taken with digital cameras can be transferred by wireless communication to a personal computer or a mobile device, whereby the wireless communication is provided by using a wireless transfer capability of the FlashAir SD memory card in the digital cameras.

Further to the example, FlashAir can also provide a built-in wireless LAN Access Point. The Access Point created by FlashAir can be accessed by a number of remote hosts at the same time to enable data sharing by multiple connections simultaneously.

The network 106 provides connectivity to different computing devices 102 so that data can be exchanged between the computing devices 102 that are connected together by the network 106. For example, the network 106 can include the Internet or any connectivity mechanisms.

The remote backup system 108 provides a user with online backup service for storing user data from computing systems, sharing such data with different users of a cloud storage or the remote backup system 108, if required, and restoring the data for the computing systems to process in case the data is corrupted or no longer residing on the computing systems. The remote backup system 108 can include cloud backup services or online backup services.

The user data can be transmitted from the computing device 102 over the network 106 and securely stored on a server of the remote backup system 108 in a professional data center. The user data can be scanned for malware and viruses and/or encrypted, before it would be transmitted to the remote backup system 108. The advantage of having user data backed up off-site, away from user's home or office keeps the user data safe from theft, fire, and other disasters.

Figure 2:
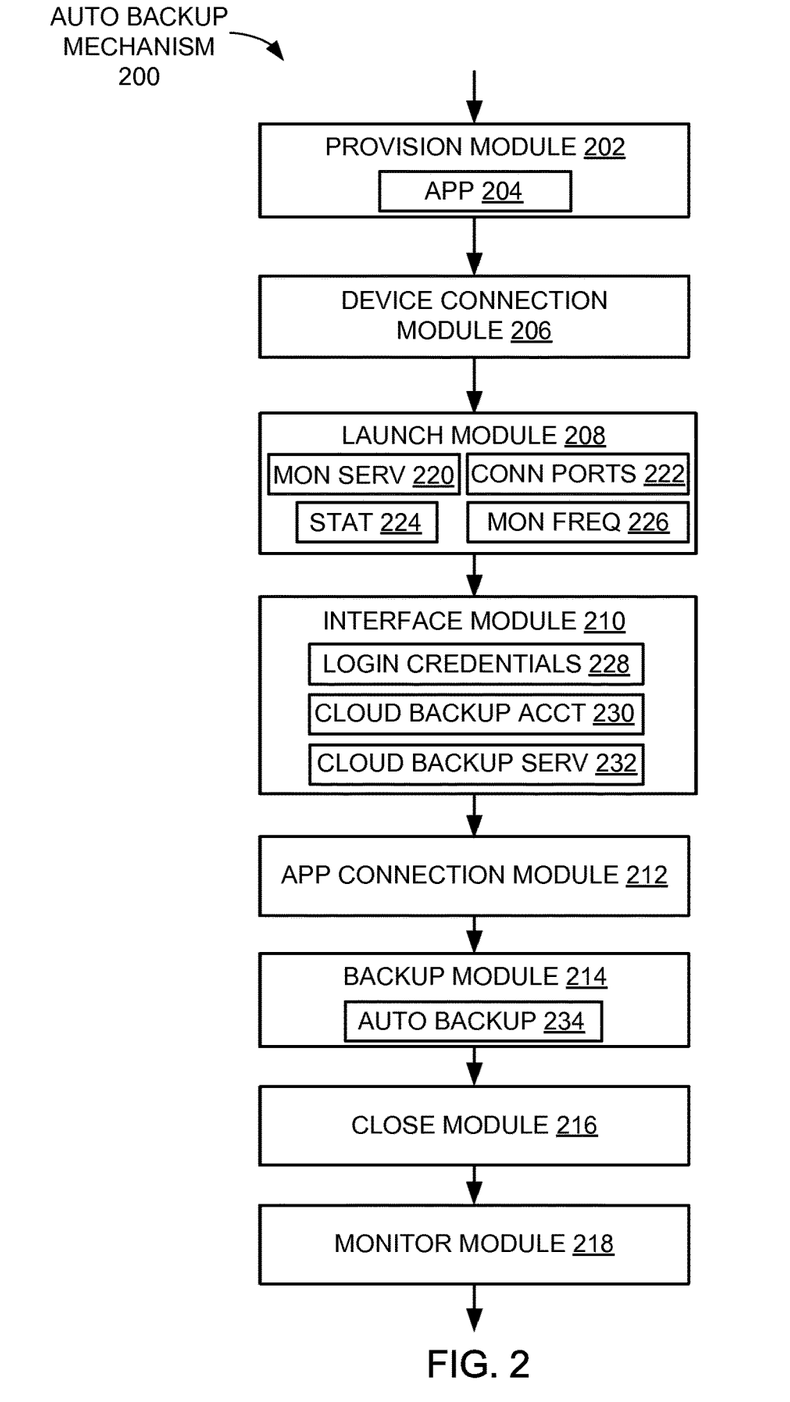
FIG. 2 is a flow chart of an automatic backup mechanism of the data storage system of FIG. 1 in a first embodiment of the present invention.

Referring now to FIG. 2, therein is shown a flow chart of an automatic backup mechanism 200 of the data storage system 100 of FIG. 1 in a first embodiment of the present invention. In the embodiments of the present invention, the data storage system 100 can be implemented with any number of modules coupled to each other. For example, the automatic backup mechanism 200 can represent a backup procedure used in an automatic cloud backup system.

The automatic backup mechanism 200 can be implemented with a provision module 202, a device connection module 206, a launch module 208, an interface module 210, an application connection module 212, a backup module 214, a close module 216, and a monitor module 218. The provision module 202 provides an automatic backup system stored on the removable storage device 104 of FIG. 1.

The provision module 202 can include an application 204 for managing or controlling operations of the automatic backup system. For example, the automatic backup system can represent an automatic cloud backup system. The device connection module 206 enables a user to connect the removable storage device 104 to the computing device 102 of FIG. 1.

For example, where the removable storage device 104 is a Universal Serial Bus (USB) drive, a user can connect the USB drive to the computing device 102. Universal Serial Bus (USB) is an industry standard that defines cables, connectors, and communications protocols used in a bus for connection, communication, and power supply between computers and electronic devices.

USB has been designed to standardize connections of computer peripherals to personal computers, both to communicate and to supply electric power. For example, the computer peripherals can include keyboards, pointing devices, digital cameras, printers, portable media players, disk drives, and network adapters.

USB has become commonplace on other devices, such as Smartphones, personal digital assistants (PDAs), and video game consoles. USB has effectively replaced a variety of earlier interfaces, such as serial and parallel ports, as well as separate power chargers for portable devices. One advantage of USB is that USB makes it possible to install and remove devices without rebooting the computing device 102 using hot swapping, making it useful for mobile peripherals including various drives.

The launch module 208 can launch the application 204. The application 204 can be stored on and run from the removable storage device 104 without host installation required. The launch module 208 can provide a monitoring service 220.

The monitoring service 220 can be executed on the computing device 102. The monitoring service 220 can be installed on the computing device 102 by the application 204 with minimal or no user interaction. The monitoring service 220 can be installed without any user interaction because the monitoring service 220 can be installed automatically without user requests or controls. The monitoring service 220 could be started automatically with computer restart.

The monitoring service 220 offers a number of advantages. One of the advantages is that the monitoring service 220 periodically monitors connection ports 222 of the computing device 102 to which the removable storage device 104 may be connected. The term "periodically" refers to approximately equally intervals, each of which is directly in between consecutive events. The monitoring service 220 can also monitor a state or a status 224 of the removable storage device 104 and files stored on the removable storage device 104.

The status 224 can indicate that the removable storage device 104 is connected to the computing device 102, any user data file has been moved or copied to the removable storage device 104, or any user data file has been modified on the removable storage device 104. When the removable storage device 104 is detected as connected to the computing device 102, the monitoring service 220 proceeds with a set of steps.

A monitoring frequency 226 of the monitoring service 220 can be either predefined in the application 204 or user defined/changed. The monitoring frequency 226 can also be tied to or associated with other events. For example, the other events can occur when certain conditions are met. As an example, the other events can occur as soon as the removable storage device 104 is connected to the computing device 102. As another example, the other events can occur when a user data file is moved to the removable storage device 104 or modified on the removable storage device 104.

The launch module 208 can include methods for setting the monitoring frequency 226. For example, the methods can include a user interface for advantageously defining or setting the monitoring frequency 226 so that a backup of user data files to a cloud backup account 230 is immediate and automatic without user interaction. For example, the user interface can include a graphical user interface (GUI).

For example, when the status 224 indicates that any user data file has been moved to the removable storage device 104, data on the removable storage device 104 can be automatically backed up to the cloud backup account 230 for which the user has already provided login credentials 228. Also for example, when the status 224 indicates that any user data file has been modified on the removable storage device 104, data on the removable storage device 104 is automatically backed up to the cloud backup account 230 for which the user has already provided the login credentials 228.

The interface module 210 provides the user interface of the application 204 for a user to enter and create the login credentials 228 for the cloud backup account 230. For example, a cloud backup service 232 for the cloud backup account 230 can be provided by a third party cloud backup service provider.

The cloud backup service 232 can include backing up any user data to the remote backup system 108 of FIG. 1, whereby the user data is accessible to a user using the computing device 102. For example, the remote backup system 108 can include a number of servers that are connected to the Internet.

For example, the cloud backup service 232 can include data backup services provided by a provider of any cloud storage and file sharing services, such as DropBox, Box, Amazon S3, OneDrive, Google Drive, SugarSync, SOS, iDrive, Carbonite, and other forms of online data backup services where users can store their data files.

Some providers with cloud backup service networks can provide application programming interface (APIs), which can also be used to backup user data. For example, DropBox offers documented and established APIs. With these APIs, the remote backup system 108 can access the cloud backup service 232 more efficiently.

For example, the remote backup system 108 can include a standalone computer or a Network-Attached-Storage (NAS) that is connected to the Internet or other networks. Also for example, the remote backup system 108 can include a cluster to or of computers connected to a network that is accessible to the computing device 102 used by a user.

For example, the application 204 can provide the user interface, using which a user can enter the login credentials 228 for the cloud backup service 232. Also for example, the login credentials 228 for the cloud backup service 232 can include a user name and a password by which the cloud backup account 230 associated with or used for the cloud backup service 232 can be accessed over the Internet.

Further, for example, the login credentials 228 for the cloud backup service 232 can be a biometric keypad or a personal identification number (PIN) coded keypad in nature. As a specific example, the login credentials 228 can provide a finger scan, a keypad for entering a personal identification number (PIN), a retina scan, or a voice command to access the cloud backup account 230.

Yet further, for example, the removable storage device 104 can use its own encryption to protect the contents of the removable storage device 104. The embodiments of the present invention are not limited to these examples.

The application connection module 212 enables the application 204 to store the login credentials 228 for the cloud backup account 230 and connect to the cloud backup account 230. The login credentials 228 for the cloud backup account 230 can be stored on a local memory of the removable storage device 104.

For security sensitive and data integrity critical applications and users personal information protection, the login credentials 228 for the cloud backup account 230 can be stored in an encrypted form so that the login credentials 228 cannot be accessed by other programs or malicious applications or read by a causal user who found a lost drive with a preloaded application. The user data files can also be encrypted with either hardware encryption or software encryption methods. Such encryption methods can help to encrypt and protect data at rest (stored on the portable storage media), in transit, and in the cloud. A virus scanning mechanism can be provided for the user data files on the removable storage device 104. It is noted that virus scanning can be done before data is encrypted.

For example, the user can opt to store login credentials or the login credentials 228 for more than one cloud backup service 232. Also for example, the user can define options as to which files are to be backed up to which a cloud service or the cloud backup service 232.

The backup module 214 transfers data for an automatic backup 234 of the removable storage device 104 to a backup server or the remote backup system 108. The automatic backup 234 refers to a process of transferring data for backup purposes without user intervention by a user after the user has provided information for authentication.

The automatic backup 234 can be performed based on the login credentials 228 and the status 224 of the removable storage device 104. The backup module 214 enables any user data that is moved to or is modified on the removable storage device 104 be automatically backed up to the cloud backup account 230 on or by the cloud backup service 232.

USB implements connections to storage devices using a set of standards called the USB mass storage device class (Mass Storage Class (MSC) or USB mass storage device class (UMS)). To a host computing device or the computing device 102, a USB device appears similar to an external hard drive, enabling drag-and-drop file transfers.

Upon removal of the removable storage device 104 from the computing device 102, the application 204 can be closed by the close module 216. The application 204 can be disconnected from the cloud backup service 232 by the backup module 214 for closing a connection between the computing device 102 and the remote backup system 108.

The monitor module 218 enables the monitoring service 220 to be left running on the computing device 102. The monitoring service 220 can listen to or monitor the removable storage device 104 for service requests. The monitoring service 220 can accept service requests arrived at or received by the monitoring service 220.

The monitoring service 220 can invoke the application 204 or other processes in response to the service requests. For example, the monitoring service 220 can be left running so that when the removable storage device 104 is connected to the computing device 102, the monitoring service 220 can automatically execute any login and data backup processes.

The monitoring service 220 can listen to or monitor the status 224. Since a cloud backup server or the remote backup system 108 can be connected to the Internet or the network 106 of FIG. 1 and the monitoring service 220 can continuously monitor the removable storage device 104, the application 204 can connect to the cloud backup service 232 using the login credentials 228 of the cloud backup account 230.

The login credentials 228 can be provided by the user at least once and stored on the removable storage device 104. The application 204 can automatically backup any user data files moved to the removable storage device 104 or data files already stored on the removable storage device 104 but modified by the user.

It is noted that the embodiments of the present invention are not dependent on a live connection to the Internet all the time to function. Instead, the user data files once moved to the removable storage device 104 can be backed up later to the cloud backup account 230 when the removable storage device 104 is connected to the computing device 102 that is connected to the Internet.

Prior art deficiencies and other problems associated with prior arts are overcome by the embodiments of the present invention. The embodiments of the present invention provide a data backup process to the cloud service for online data backup that is simple and efficient by providing the application 204, or app, on the removable storage device 104.

A growing need for an automated cloud backup method exists. Contents from various computing devices can be backed up to the cloud backup service 232 over the network 106, with minimal or no user interaction. Unlike prior art methods, the embodiments of the present invention provide automation. The automation is provided so that any data moved to or modified on the removable storage device 104 connected to a computing device is backed up to the cloud backup service for which the user has provided login credentials at least once.

The prior art methods are rather manual and heavily dependent on human interaction of moving files from one source to another and use, for example, a "copy and paste" method.

The embodiments of the present invention disclosed herein provide automated method and system, whereby the monitoring service 220 can be installed on the computing device 102 and can run in the background. The user can be prompted to at least once to provide the login credentials 228 for a login to the cloud backup service 232. The login credentials 228 can be stored on the removable storage device 104 to allow the application 204 to connect to the cloud backup service 232 without any further user interaction.

For example, the application 204 can include the user interface, using which a user can enter the login credentials 228 for the cloud backup service 232 at least once. Also for example, the removable storage device 104 with a storage capacity to store a number of files can be provided.

The application 204 can be stored on the removable storage device 104. Upon connecting the removable storage device 104 to the computing device 102, the monitoring service 220 can be installed on the computing device 102.

The application 204 can provide the user interface for the user to enter the login credentials 228 of the cloud backup service 232. The login credentials 228 can be encrypted and stored on the removable storage device 104.

Any user data that is moved to the removable storage device 104 or is modified on the removable storage device 104 can be automatically backed up to the cloud backup service 232 for which the user has already provided the login credentials 228 at least once. A user can selectively exclude some of the files or the user data from the automatic backup process.

For example, the user can opt to store the login credentials 228 for more than one cloud backup service 232 and restore to more than one computing device. Also for example, the user can specify options as to which of the files are to be backed up to the cloud backup service 232.

The modules can be implemented in hardware or software. For example, the modules can be implemented as electronic circuitry, such as integrated circuits, discrete circuit, or a combination thereof. In another example, the modules can be implemented in software, such as software running on a dedicated processor, a microprocessor, co-processor, or a combination thereof.

The provision module 202 or the device connection module 206 can be implemented using the computing device 102, the removable storage device 104, or a combination thereof. The launch module 208 can be implemented using the computing device 102, the removable storage device 104, the connection ports 222 of the computing device 102, or a combination thereof.

The interface module 210 can be implemented using the computing device 102, the removable storage device 104, or a combination thereof. The application connection module 212, the backup module 214, or the close module 216 can be implemented using the computing device 102, the removable storage device 104, the remote backup system 108, or a combination thereof. The monitor module 218 can be implemented using the computing device 102, the removable storage device 104, or a combination thereof.

The provision module 202 can be coupled to the device connection module 206. The device connection module 206 can be coupled to the launch module 208. The launch module 208 can be coupled to the interface module 210. The interface module 210 can be coupled to the application connection module 212. The application connection module 212 can be coupled to the backup module 214. The backup module 214 can be coupled to the close module 216. The close module 216 can be coupled to the monitor module 218.

The physical transformation of creating the login credentials 228 for storing on the removable storage device 104 to transfer the data for the automatic backup 234 results in movement in the physical world, such as people using the computing device 102, the removable storage device 104, the network 106, and the remote backup system 108 based on the operation of the data storage system 100. As the movement in the physical world occurs, the movement itself creates additional information that is converted back to the data for the automatic backup 234 for the continued operation of the data storage system 100 and to continue the movement in the physical world.

It has been discovered that the login credentials 228 when encrypted and stored on the removable storage device 104 provide better security because the user data files cannot be accessed by other programs or malicious applications during the automatic backup 234.

It has also been discovered that the user data files transferred for the automatic backup 234 of the removable storage device 104 improves reliability. The reliability is improved because the user data files are securely and automatically saved to the remote backup system 108 based on the login credentials 228 and the status 224 of the removable storage device 104.

It has further been discovered that the monitoring service 220 installed on the computing device 102 improves the user interface because the monitoring service 220 is able to automatically detect the status 224 of the removable storage device 104 to enable the automatic backup 234 without having the user to intervene.

Figure 3:
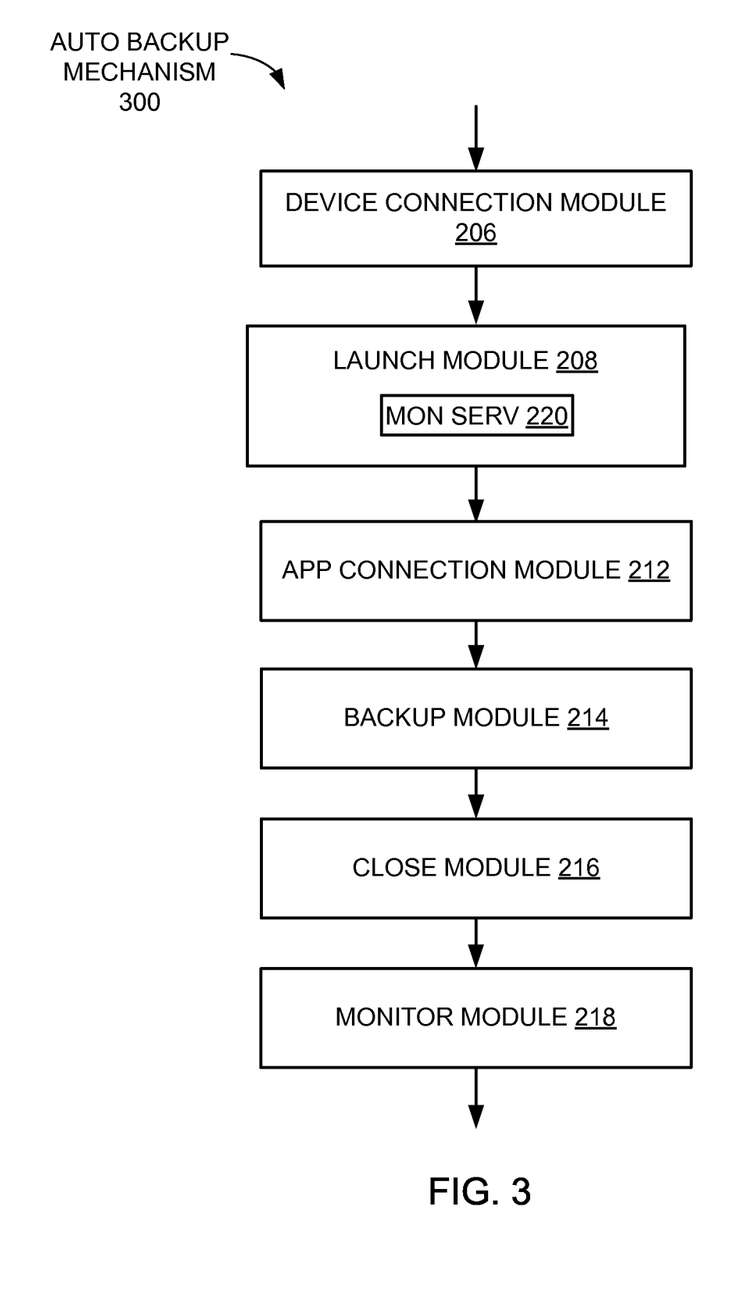
FIG. 3 is a flow chart of an automatic backup mechanism of the data storage system of FIG. 1 in a second embodiment of the present invention.

Referring now to FIG. 3, therein is shown a flow chart of an automatic backup mechanism 300 of the data storage system 100 of FIG. 1 in a second embodiment of the present invention. The automatic backup mechanism 300 can be implemented with the device connection module 206, the launch module 208, the application connection module 212, the backup module 214, the close module 216, and the monitor module 218.

The device connection module 206 enables a user to connect the removable storage device 104 of FIG. 1 to the computing device 102 of FIG. 1 with the monitoring service 220 installed on the computing device 102. The monitoring service 220 can monitor the removable storage device 104 when the removable storage device 104 is connected to the computing device 102.

The launch module 208 can launch the application 204 of FIG. 2. The application 204 can be stored on the removable storage device 104. When the monitoring service 220 detects that the removable storage device 104 has been connected to the computing device 102, the monitoring service 220 can automatically launch the application 204 stored on the removable storage device 104.

Using the login credentials 228 of FIG. 2 of the cloud backup account 230 of FIG. 2, the application connection module 212 enables the application 204 to connect to the cloud backup service 232 of FIG. 2. The backup module 214 automatically uploads any user data files moved to or modified on the removable storage device 104 to the remote backup system 108 of FIG. 1.

For example, the user can copy and paste user data files from the computing device 102 to the removable storage device 104. Also for example, the user can modify a user data file already stored on the removable storage device 104 by opening the user data file using a software program, modifying the user data file, and saving the modified user data file.

Since the monitoring service 220 can continuously monitor the removable storage device 104, the monitoring service 220 can sense or monitor that a new user data file has been either moved to or modified on the removable storage device 104. In addition, the monitoring service 220 can initiate a file backup process by connecting to the cloud backup service 232 and uploading the user data file to the cloud backup account 230 for which the login credentials 228 are already stored on the removable storage device 104.

For example, a connection to the cloud backup service 232 can be kept alive as long as the removable storage device 104 is connected to the computing device 102. Also for example, the connection can be terminated as soon as the user data files have been uploaded to the cloud backup service 232 from the removable storage device 104. Any subsequent movement of user data files to the removable storage device 104 can be detected and thus used to initiate the application 204 to re-connect to the cloud backup service 232 and perform the file backup process again.

For example, user data files can be uploaded to the cloud backup service 232 in a sequence. Also for example, the user can specify a set of criteria including relevance of the files, data backup quotas, alternate cloud backup services, etc.

As a specific example, the user data files with the highest importance can be backed up first and the user data files with the least importance can be backed up last. Also for example, user data files can be backed up with in the same sequence as the user data files were moved or modified on the removable storage device 104.

A user can also be able to specify relevance or importance of the user data files. Thus, the user data files with the most relevance or importance and thus are more valuable can be backed up first and the user data files with the least relevance or importance and thus are less valuable can be backed up last. There can be other ways to prioritize the user data files and the embodiments of the present invention are not limited to the examples described herein.

For example, user data files can be scanned for malware and viruses and/or encrypted when the user data files are moved to or stored on the removable storage device 104. In addition, the user data files could be scanned for malware and viruses and/or encrypted before uploading into or backing up to the cloud, so they would be protected at rest, and in transit, and in the cloud(s).

Further, for example, user data file encryption and virus-scanning processes can take place entirely on the computing device 102 to which the removable storage device 104 is connected. Yet further, for example, a user data file encryption and virus-scanning software can be pre-bundled with or pre-installed and pre-activated (optional) on the removable storage device 104.

The monitor module 218 enables the monitoring service 220. The monitoring service 220 can be left running on the computing device 102.

It has been discovered that the login credentials 228 already stored on the removable storage device 104 provide reliability. The reliability is provided because the login credentials 228 already stored on the removable storage device 104 are used by the monitoring service 220 to initiate the file backup process by connecting the application 204 to the cloud backup service 232 and uploading the user data file to the cloud backup account 230.

Figure 4:
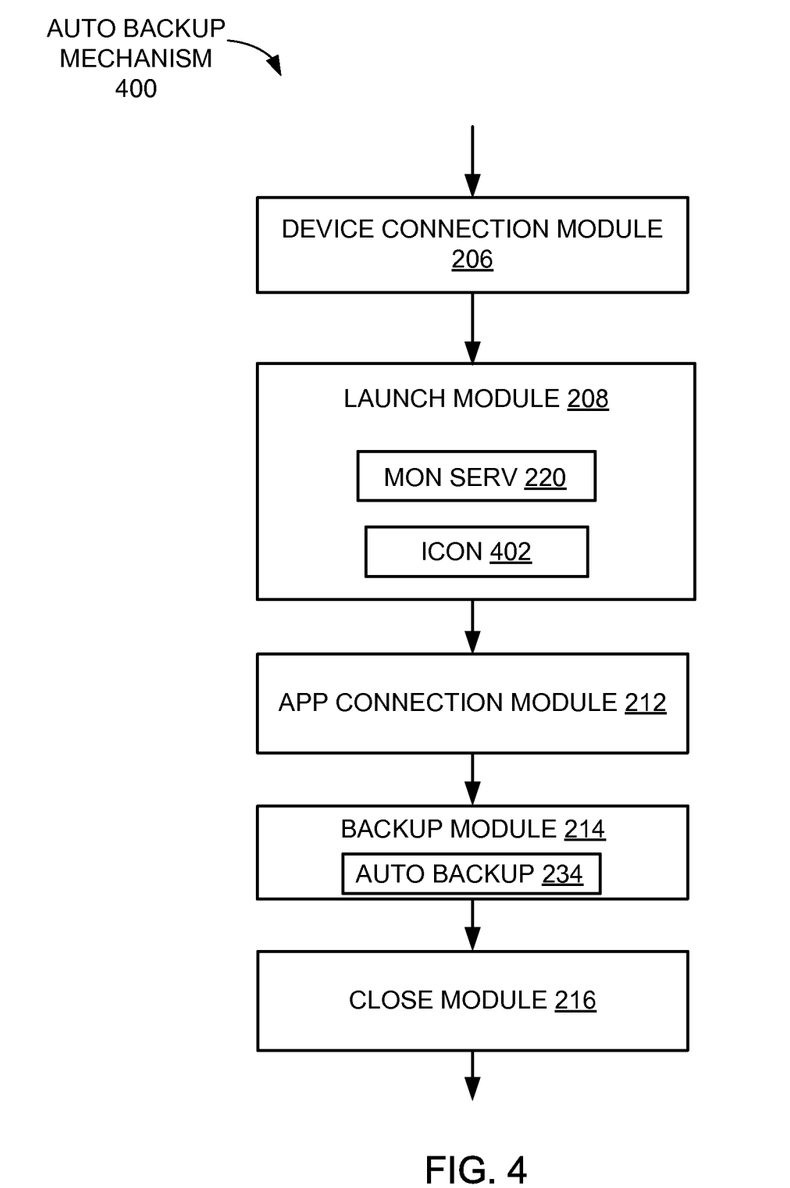
FIG. 4 is a flow chart of an automatic backup mechanism of the data storage system of FIG. 1 in a third embodiment of the present invention.

Referring now to FIG. 4, therein is shown a flow chart of an automatic backup mechanism 400 of the data storage system 100 of FIG. 1 in a third embodiment of the present invention. FIG. 4 shows an example process that can be used in the third embodiment.

The automatic backup mechanism 400 can be implemented with the device connection module 206, the launch module 208, the application connection module 212, the backup module 214, and the close module 216. The device connection module 206 enables a user to connect the removable storage device 104 of FIG. 1 to the computing device 102 of FIG. 1 as an untrusted computing device, which may not have the monitoring service 220 installed on the computing device 102. The term "untrusted computing device" used herein refers to any computing device that is not secured.

The computing device 102 may not be trusted by the user due to any number of reasons. For example, the computing device 102 that is in an Internet cafe, a library, or a friend's place can be used temporarily. However, a user may not store the user data files on the computing device 102 since the computing device 102 can be either publically available or accessible by others with whom user data file sharing may not be considered safe or beneficial.

The launch module 208 enables a user to launch the application 204 of FIG. 2. The application 204 can be stored on the removable storage device 104. The application 204 can be launched without the monitoring service 220 installed on the computing device 102.

The application 204, using the already stored credentials of the cloud backup account 230 of FIG. 2 saved on the removable storage device 104, can connect to the cloud backup service 232 of FIG. 2. The application 204 can automatically upload any (or only selected files) of the user data files that are moved to or are modified on the removable storage device 104.

The user can launch the application 204 by accessing the removable storage device 104 from the computing device 102 and double clicking on an icon 402 for the application 204, whereby the icon 402 can be displayed on the video display. The icon 402 can be used as a method for launching the application 204 in any of the embodiments of the present invention.

Using the login credentials 228 of FIG. 2 of the cloud backup account 230, the application connection module 212 enables a user or the application 204 to be connected to the cloud backup service 232. The login credentials 228 and the cloud backup account 230 can already be stored on the removable storage device 104.

The backup module 214 can automatically upload any user data files moved to or modified on the removable storage device 104 to the remote backup system 108 of FIG. 1 for the automatic backup 234. Upon removal of the removable storage device 104 from the untrusted computing device or the computing device 102, the application 204 can be closed by the close module 216. The application 204 can also be disconnected from the cloud backup service 232 by the close module 216.

It has been discovered that the automatic backup 234 of the removable storage device 104 connected to the untrusted computing device is secured because the monitoring service 220 is not installed on the untrusted computing device.

Figure 5:
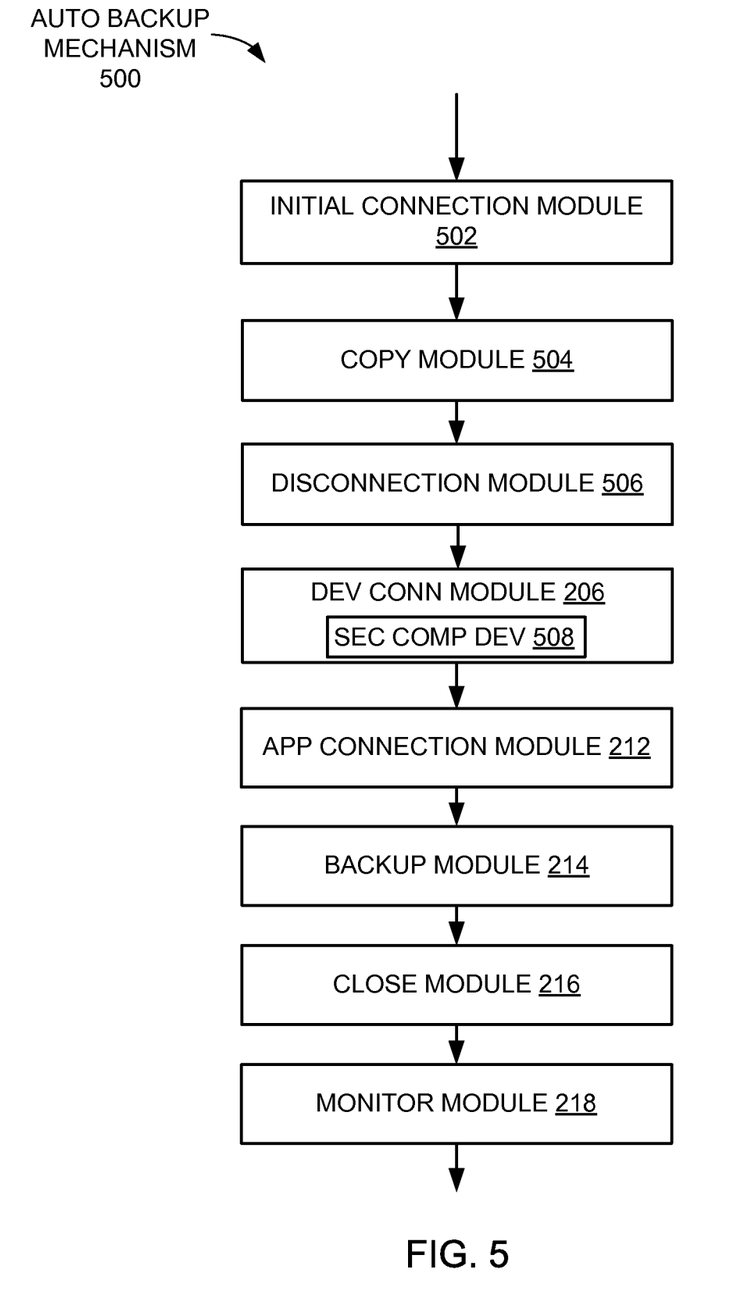
FIG. 5 is a flow chart of an automatic backup mechanism of the data storage system of FIG. 1 in a fourth embodiment of the present invention.

Referring now to FIG. 5, therein is shown a flow chart of an automatic backup mechanism 500 of the data storage system 100 of FIG. 1 in a fourth embodiment of the present invention. FIG. 5 shows an example process that can be used in the fourth embodiment.

The automatic backup mechanism 500 can be implemented with an initial connection module 502, a copy module 504, a disconnection module 506, the device connection module 206, the application connection module 212, the backup module 214, the close module 216, and the monitor module 218. The initial connection module 502 enables a user to connect the removable storage device 104 of FIG. 1 to a first computing device or the computing device 102 of FIG. 1, which may not have the monitoring service 220 of FIG. 2 installed on the computing device 102.

The copy module 504 enables the user to copy user data files to the removable storage device 104. For example, the user can be able to copy and paste the user data files from the computing device 102 to the removable storage device 104.

The disconnection module 506 enables the user to disconnect the removable storage device 104 from the first computing device. The device connection module 206 enables the user to connect the removable storage device 104 to a second computing device 508, on which the monitoring service 220 can be installed.

Without launching the application 204 of FIG. 2, the application connection module 212 enables the application 204 to automatically connect to the cloud backup account 230 of FIG. 2 for which the login credentials 228 of FIG. 2 are stored on the removable storage device 104. The backup module 214 automatically backs up the user data files based on the status 224 of FIG. 2. The status 224 can be detected by the monitoring service 220 installed on the second computing device 508.

The status 224 indicates that the user data files were copied to or moved to the removable storage device 104 from the first computing device or that the user data files were modified on the removable storage device 104. The backup module 214 automatically backs up the user data files to the cloud backup account 230 on the remote backup system 108 of FIG. 1.

Upon removal of the removable storage device 104 from the second computing device 508, the application 204 can be disconnected from the cloud backup service 232 of FIG. 2 by the close module 216. The monitor module 218 enables the monitoring service 220 to be left running on the second computing device 508.

The initial connection module 502, the copy module 504, or the disconnection module 506 can be implemented using the computing device 102, the removable storage device 104, or a combination thereof.

The initial connection module 502 can be coupled to the copy module 504. The copy module 504 can be coupled to the disconnection module 506. The disconnection module 506 can be coupled to the device connection module 206.

It has been discovered that the user data files automatically backed up to the remote backup system 108 based on the status 224 detected by the monitoring service 220 installed on the second computing device 508 improves reliability. The reliability is improved because the user data files copied from the first computing device to the removable storage device 104 are completely saved to the remote backup system 108 after the removable storage device 104 is disconnected from the first computing device and subsequently connected to the second computing device 508.

Figure 6:
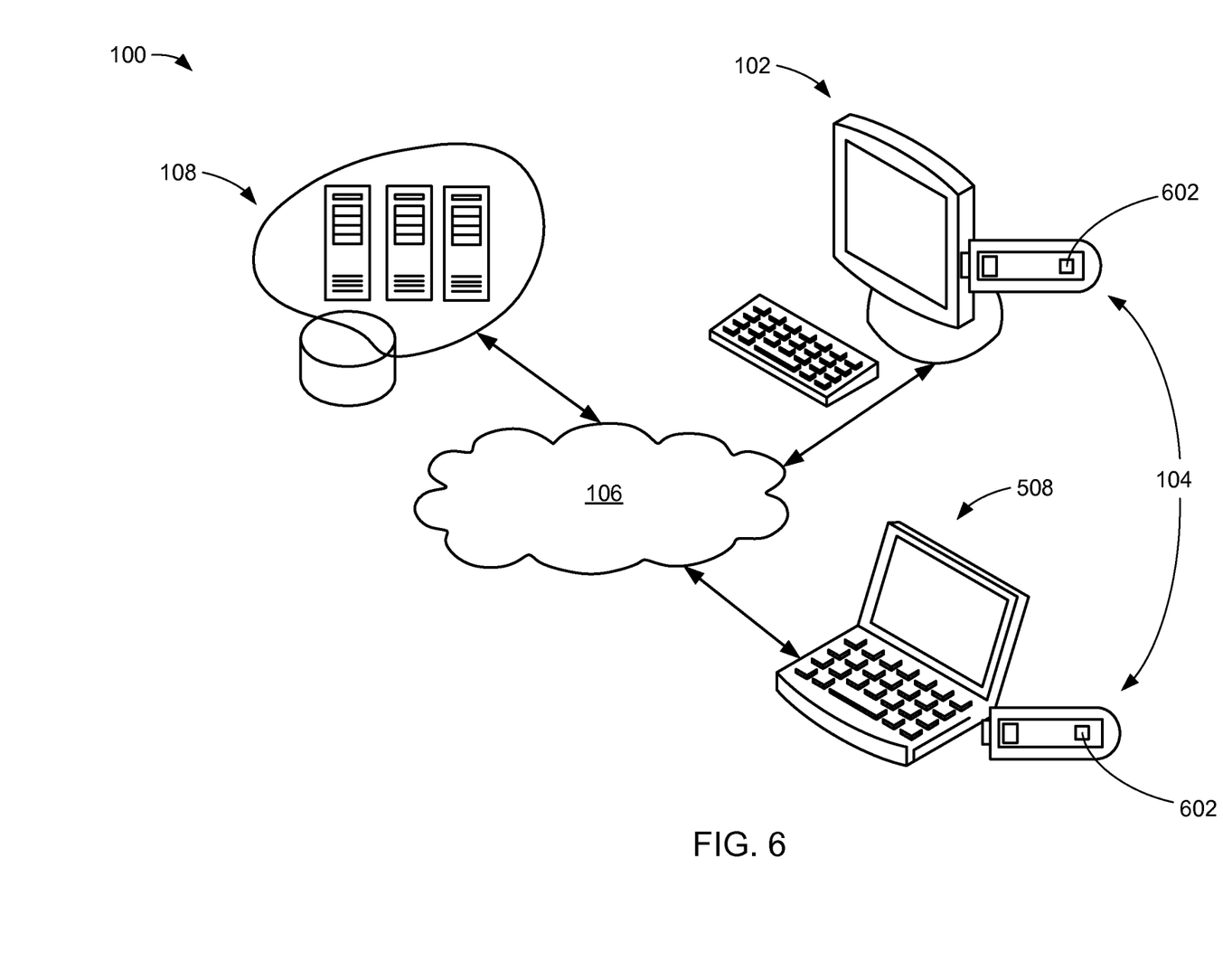
FIG. 6 is another network diagram of the data storage system.

Referring now to FIG. 6, therein is shown another network diagram of the data storage system 100. The another network diagram shows the process described in FIG. 5. FIG. 6 shows the first computing device or the computing device 102, where the monitoring service 220 of FIG. 2 may not be installed. The user can connect the removable storage device 104 to the first computing device.

The user can move the user data files or modifies the user data files on the removable storage device 104. The user can disconnect the removable storage device 104 from the first computing device. The user can connect the removable storage device 104 to the second computing device 508, where the monitoring service 220 may already be installed.

The monitoring service 220 can detect that the removable storage device 104 has been connected to the second computing device 508. Thus, the monitoring service 220 can automatically connect to the cloud backup service 232 of FIG. 2 over the network 106 using the login credentials 228 of FIG. 2 of the cloud backup account 230 of FIG. 2, whereby the login credentials 228 may already be stored on the removable storage device 104.

The user data files, which were moved to or modified on the removable storage device 104 when the removable storage device 104 was connected to the first computing device or the computing device 102, can be automatically backed up to the cloud backup service 232 over the network 106. For example, the monitoring service 220 can continuously monitor the computing device 102 and the removable storage device 104.

Steps described above can be repeated as often as necessary to obtain the most efficient results. For example, these steps can be repeated every time a new user data file is moved or copied to the removable storage device 104. Also for example, these steps can be repeated periodically including once very minute or once every hour.

It has been noted that using methods disclosed by the automatic backup mechanisms in this application, the automated cloud backup could be achieved. The automated cloud backup can be easy to use with minimal or no interaction from the user.

Thus, the user data files that are moved to the removable storage device 104 can be automatically backed up to the cloud backup service 232 connected to the network 106. The user has at least once provided login credentials or the login credentials 228 for the cloud backup service 232.

For example, the cloud backup service 232 can be public such as those provided by the cloud backup service provider. Also for example, the cloud backup service 232 can be private such as a data backup service provided by a corporate office for its employees or a family member doing backup to their family only Network-Attached-Storage or a family server.

It is to be noted that the embodiments of the present invention are not limited to the examples above. The intent is to cover all possible removable storage devices and computing devices that are available in the market today or will become available in the future as the computing industry evolves over time. The intent of the application is to cover all such combinations and permutations not listed here. The examples above are not intended to be limiting but are illustrative and exemplary.

It is understood that although the term application has been used as an example in this disclosure, in essence the term can also apply to any other piece of software code where the embodiments of the present invention are incorporated. A software application can be implemented in a standalone configuration or in combination with other software programs and is not limited to any particular operating system or programming paradigm described here. Thus, the embodiments of the present invention are intended to cover all applications and user interactions described above.

For example, the application 204 of FIG. 2 can be licensed based on unique hardware identification (ID) information 602 of the removable storage device 104. Also for example, the unique hardware identification (ID) information 602 can include only one of the Unique Device Identifier (UDI), a Product Identification (PID), a Vendor Identification (VID), a specific serial number, or an identifier using any other methods.

Further, for example, the unique hardware identification (ID) information 602 can include a combination of the Unique Device Identifier (UDI), the Product Identification (PID), the Vendor Identification (VID), the specific serial number, the version number, or the identifier using any of the other methods. Yet further, for example, the application 204 can include an update function, a drive reset function, a license recovery function, and other such features incorporated in the application 204.

The application 204 can be licensed using any of the modules described above. For example, the application 204 can be licensed using the provision module 202, the device connection module 206, the launch module 208, the interface module 210, the application connection module 212, the backup module 214, or a combination thereof.

The computer program can include a computer usable medium having a computer usable program code. The computer usable program code can be used for graphically presenting to the users options for scrolling via a touchscreen interface on the video display.

Figure 7:
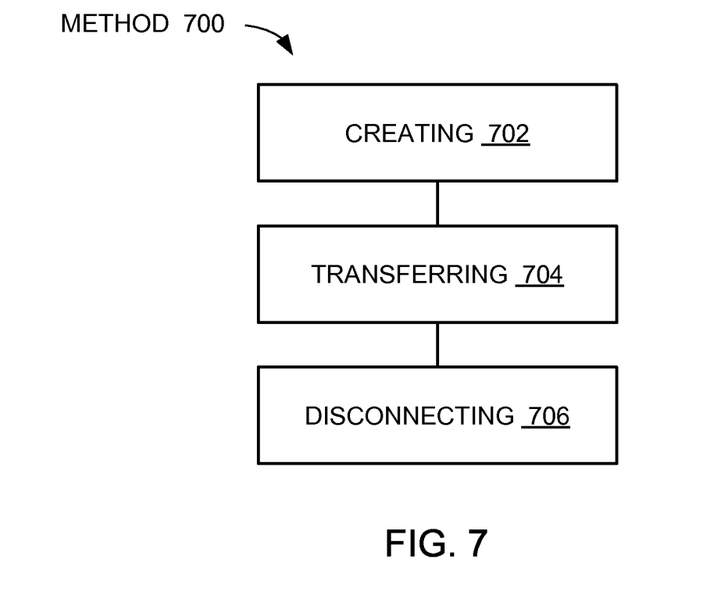
FIG. 7 is a flow chart of a method of operation of a data storage system in a further embodiment of the present invention.

Referring now to FIG. 7, therein is shown a flow chart of a method 700 of operation of a data storage system in a further embodiment of the present invention. The method 700 includes: creating a login credential for storing on a removable storage device in a block 702; transferring data for an automatic backup of the removable storage device to a remote backup system based on the login credential and a status of the removable storage device in a block 704; and disconnecting an application from a cloud backup service for closing a connection between a computing device and the remote backup system with the data from the automatic backup in a block 706.

It has been found that the data storage system provides the previously described advantages that provide solutions to problems of ever-increasing commercial competitive pressures along with growing consumer expectations. Solutions to these problems have been long sought but prior developments have not taught or suggested any solutions and, thus, solutions to these problems have long eluded those skilled in the art.

Thus, it has been discovered that the data storage system 100 of FIG. 1 of the embodiments of the present invention furnish important and heretofore unknown and unavailable solutions, capabilities, and functional aspects for the data storage system 100 with the removable storage device 104 of FIG. 1. The resulting method, process, apparatus, device, product, and/or system is straightforward, cost-effective, uncomplicated, highly versatile and effective, can be surprisingly and unobviously implemented by adapting known technologies, and are thus readily suited for efficiently and economically manufacturing data storage systems fully compatible with conventional manufacturing methods or processes and technologies.

Another important aspect of the embodiments of the present invention is that it valuably supports and services the historical trend of reducing costs, simplifying systems, and increasing performance.

These and other valuable aspects of the embodiments of the present invention consequently further the state of the technology to at least the next level.

While the embodiments of the present invention have been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a data storage system comprising:
    storing an application on a removable storage device, the application configured for automatic backup of files stored on the removable storage device to a remote backup service;
    detecting a connection of the removable storage device to a computing device; and running, on the computing device, the application stored on the removable storage device, the application being run without being installed in permanent storage of the computing device, wherein running the application further comprises:
  when a login credential for the remote backup service is not available, receiving authentication information for creating the login credential and storing the login credential on the removable storage device;
  connecting the application running on the computing device to the remote backup service utilizing the login credential;
  transferring, after the connecting, data for the automatic backup of the removable storage device to the remote backup service based on a status of the removable storage device; and
  disconnecting the application running on the computing device from the remote backup service after the transferring the data for the automatic backup.

2. The method as claimed in claim 1, wherein transferring the data includes transferring a file based on the status indicating that the file has been moved to the removable storage device.

3. The method as claimed in claim 1, further comprising: installing a monitoring service for executing on the computing device.

4. The method as claimed in claim 1, wherein the computing device is an untrusted computing device.

5. The method as claimed in claim 1, further comprising: encrypting the login credential for storing on the removable storage device.

6. The method as claimed in claim 1, further comprising: scanning user data for malware and viruses before backing up the user data to the remote backup service.

7. The method as claimed in claim 1, further comprising: encrypting user data for storage on the removable storage device or for hacking up to the remote backup service.

8. The method as claimed in claim 1, further comprising: licensing the application based on a unique hardware identification of the removable storage device, the unique hardware identification including one or more of a Unique Device Identifier (UDI), a Product Identification (PID), a Vendor Identification (VID), a version number, and a serial number.

9. The method as claimed in claim 1, further comprising:
copying a data file to the removable storage device;
disconnecting the removable storage device from the computing device;
connecting the removable storage device to another computing device; and
backing up the removable storage device, via the other computing device to the remote backup service, based on the login credential stored on the removable storage device.

10. A non-transitory machine-readable storage medium including instructions that, when executed by a machine, cause the machine to perform operations comprising:
  storing an application on a removable storage device, the application configured for automatic backup of files stored on the removable storage device to a remote backup service;
  detecting a connection of the removable storage device to a computing device; and
  running, on the computing device, the application stored on the removable storage device, the application being run without being installed in permanent storage of the computing device, wherein running the application further comprises:
    when a login credential for the remote backup service is not available, receiving authentication information for creating the login credential and storing the login credential on the removable storage device;
    storing the login credential on the removable storage device;
    connecting the application running on the computing device to the remote backup service utilizing the login credential;
    transferring, after the connecting, data for the automatic backup of the removable storage device to the remote backup service based on a status of the removable storage device; and
    disconnecting the application running on the computing device from the remote backup service after the transferring the data for the automatic backup.

11. The machine-readable storage medium as claimed in claim 10, wherein transferring the data includes transferring a file based on the status indicating that the file has been moved to the removable storage device.

12. The machine-readable storage medium as claimed in claim 10, wherein the machine further performs comprising: installing a monitoring service without user interaction for executing on the computing device.

13. The machine-readable storage medium as claimed in claim 10, wherein the computing device is an untrusted computing device.

14. The machine-readable storage medium as claimed in claim 10, wherein the machine further performs comprising:
  copying a data file to the removable storage device;
  disconnecting the removable storage device from the computing device;
  connecting the removable storage device to another computing device; and
  backing up the removable storage device, from the other computing device to the remote backup service, based on the login credential stored on the removable storage device.

15. A removable storage device comprising:
a memory;
an application logic configured for automatic backup of files stored on the removable storage device to a remote backup service when the removable storage device is connected to a computing device, the application logic being configured to be run on the computing device without being installed in permanent storage of the computing device;
an interface logic for receiving authentication information for creating a login credential for the remote backup service and storing the login credential on the memory of the removable storage device;
a connection logic for connecting the application logic to the remote backup service utilizing the login credential;
a backup logic for transferring data for the automatic backup of the removable storage device to the remote backup service based on a status of the removable storage device; and
a close logic for disconnecting the application logic from the remote backup service after the transferring the data for the automatic backup.

16. The removable storage device as claimed in claim 15, wherein the backup logic is for transferring a file for the automatic backup based on the status indicating that the file has been moved to the removable storage device.

17. The removable storage device as claimed in claim 15, further comprising:
a device connection logic for installing a monitoring service for executing on the computing device.

18. The removable storage device as claimed in claim 15, further comprising:
a device connection logic for connecting the removable storage device to the computing device, wherein the computing device is an untrusted computing device.

19. The removable storage device as claimed in claim 15, wherein the interface logic is for encrypting the login credential for storing on the removable storage device.

20. The removable storage device as claimed in claim 15, further comprising:
an application connection logic for scanning user data for malware and viruses before backing up the user data to the remote backup service.

21. The removable storage device as claimed in claim 15, further comprising:
an application connection logic for encrypting user data for storage on the removable storage device or for backing up the user data to the remote backup service.

22. The removable storage device as claimed in claim 15, wherein the interface logic is for licensing the application logic based on a unique hardware identification of the removable storage device, the unique hardware identification including one or more of a Unique Device Identifier (UDI), a Product Identification (PID), a Vendor Identification (VID), a version number, and a serial number.

23. The removable storage device as claimed in claim 15, further comprising:
a copy logic for copying a data file to the removable storage device;
a disconnection logic for disconnecting the removable storage device from the computing device; and
a device connection logic for connecting the removable storage device to another computing device, wherein the backup logic is for automatically backing up, via the other computing device, the data file from the removable storage device to the remote backup service based on the login credential stored on the removable storage device.

24. The removable storage device as claimed in claim 15, wherein the interface logic is for creating the login credential for storing on the removable storage device connected to the computing device.

25. The removable storage device as claimed in claim 24, wherein the backup logic is for transferring the data for the automatic backup based on the status indicating a user data file has been modified on the removable storage device.

26. The removable storage device as claimed in claim 24, further comprising:
a device connection logic for installing a monitoring service without user interaction for executing on the computing device.

27. The removable storage device as claimed in claim 24, further comprising:
a device connection logic for connecting the removable storage device to the computing device, wherein the computing device is an untrusted computing device; and
a launch logic for launching the application logic stored on the removable storage device, wherein the application logic is launched without a monitoring service installed on the computing device.

28. The removable storage device as claimed in claim 24 further comprising:
a copy logic for copying a data file to the removable storage device;
a disconnection logic for disconnecting the removable storage device from the computing device without a monitoring service installed thereon; and
a device connection logic for connecting the removable storage device to another computing device with the monitoring service installed thereon, wherein the backup logic is for automatically backing up the data file to the remote backup service based on the status detected by the monitoring service installed on the other computing device.

\* \* \* \* \*

UNITED STATES PATENT AND TRADEMARK OFFICE
CERTIFICATE OF CORRECTION

PATENT NO. : 10,992,747 B2  
APPLICATION NO. : 14/624560  
DATED : April 27, 2021  
INVENTOR(S) : Bolotin et al.

Page 1 of 1

It is certified that error appears in the above-identified patent and that said Letters Patent is hereby corrected as shown below:

On the Title Page

In Column 2, Item (56) under "U.S. Patent Documents", Line 2, after "Johnson et al.", insert --¶8,832,440 B2 9/2014 Johnson, et al.--

Signed and Sealed this  
Tenth Day of August, 2021

Drew Hirshfeld  
*Performing the Functions and Duties of the*  
*Under Secretary of Commerce for Intellectual Property and*  
*Director of the United States Patent and Trademark Office*